(12) United States Patent
Guiset et al.

(10) Patent No.: US 9,664,375 B2
(45) Date of Patent: May 30, 2017

(54) LIGHT-EMITTING, GLASS-CERAMIC ARTICLE

(75) Inventors: Pierrick Guiset, Massy (FR); Jean-Yves Laluet, Paris (FR); Claire Mallet, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 0 days.

(21) Appl. No.: 13/882,324

(22) PCT Filed: Oct. 26, 2011

(86) PCT No.: PCT/FR2011/052491
§ 371 (c)(1),
(2), (4) Date: Jul. 16, 2013

(87) PCT Pub. No.: WO2012/059664
PCT Pub. Date: May 10, 2012

(65) Prior Publication Data
US 2013/0286630 A1   Oct. 31, 2013

(30) Foreign Application Priority Data

Nov. 4, 2010 (FR) .................................... 10 59082

(51) Int. Cl.
*F21V 7/04* (2006.01)
*F21V 33/00* (2006.01)
(Continued)

(52) U.S. Cl.
CPC .......... *F21V 33/0044* (2013.01); *F21V 19/00* (2013.01); *F24C 7/083* (2013.01);
(Continued)

(58) Field of Classification Search
CPC .... F21V 19/00; F21V 33/0044; F24C 15/105; F24C 7/083; G02B 6/006; G02B 6/0095; Y10T 29/49002
(Continued)

(56) References Cited

U.S. PATENT DOCUMENTS 4,211,820 A * 7/1980 Cantaloupe et al. ......... 428/410
5,013,893 A * 5/1991 Goessler et al. ........... 219/445.1
(Continued)

FOREIGN PATENT DOCUMENTS

EP   0 438 656   7/1991
EP   1 505 414   2/2005

OTHER PUBLICATIONS

International Search Report Issued Dec. 30, 2011 in PCT/FR11/52491 Filed Oct. 26, 2011.
(Continued)

*Primary Examiner* — Jason Moon Han
*Assistant Examiner* — Omar Rojas Cadima
(74) *Attorney, Agent, or Firm* — Oblon, McClelland, Maier & Neustadt, L.L.P.

(57) ABSTRACT

An article including at least one lighting zone, manufacture of the article, and a cooking apparatus including such an article when in a form of a glass-ceramic plate. The article includes at least one glass-ceramic substrate, and at least one light guide, the light guide coupled to at least one light source on one side outside of the lighting zone, and including, in the lighting zone, at least one mechanism of extracting radiation emitted by the light source.

19 Claims, 2 Drawing Sheets

(51) Int. Cl.
*F24C 7/08* (2006.01)
*F24C 15/10* (2006.01)
*F21V 8/00* (2006.01)
*F21V 19/00* (2006.01)
*H05B 6/12* (2006.01)

(52) U.S. Cl.
CPC ............ F24C 15/105 (2013.01); G02B 6/006 (2013.01); H05B 6/1218 (2013.01); G02B 6/0095 (2013.01); Y10T 29/49002 (2015.01)

(58) Field of Classification Search
USPC ......... 362/612, 615, 616, 619, 627, 629, 92, 362/285, 600; 385/901; 219/443, 444, 219/506, 620, 445.1, 623, 624, 55, 460.1
See application file for complete search history.

(56) References Cited

U.S. PATENT DOCUMENTS

| | | | | |
|---|---|---|---|---|
| 5,138,135 | A * | 8/1992 | Husslein et al. | 219/445.1 |
| 6,969,834 | B2 * | 11/2005 | Kaji | G02B 6/001 |
| | | | | 219/506 |
| 7,041,945 | B2 * | 5/2006 | Aihara et al. | 219/622 |
| 7,722,956 | B2 * | 5/2010 | Collins | C03C 27/06 |
| | | | | 428/34 |
| 2002/0139023 | A1 * | 10/2002 | Gianotti et al. | 40/546 |
| 2003/0006230 | A1 * | 1/2003 | Kaji et al. | 219/620 |
| 2003/0164370 | A1 * | 9/2003 | Aihara et al. | 219/622 |
| 2003/0210537 | A1 * | 11/2003 | Engelmann | G02B 6/0018 |
| | | | | 362/23.15 |
| 2004/0196558 | A1 * | 10/2004 | Takahashi et al. | 359/613 |
| 2004/0196646 | A1 * | 10/2004 | Machi | B64D 47/06 |
| | | | | 362/602 |
| 2005/0069254 | A1 | 3/2005 | Schultheis et al. | |
| 2005/0175282 | A1 * | 8/2005 | Wright et al. | 385/31 |
| 2006/0139946 | A1 * | 6/2006 | Tamaki | 362/602 |
| 2007/0124970 | A1 * | 6/2007 | Hjaltason | 40/546 |
| 2008/0117618 | A1 * | 5/2008 | Chen | 362/24 |
| 2008/0190409 | A1 * | 8/2008 | Demol et al. | 126/211 |

OTHER PUBLICATIONS

International Preliminary Report on Patentability and Written Opinion (English translation of Written Opinion) issued May 8, 2013 in PCT/FR2011/052491 filed Oct. 26, 2011.
U.S. Appl. No. 14/124,952, filed Jan. 8, 2014, Guiset, et al.
U.S. Appl. No. 14/421,678, filed Feb. 13, 2015, Laluet, et al.
U.S. Appl. No. 14/442,619, filed May 13, 2015, Laluet, et al.

* cited by examiner

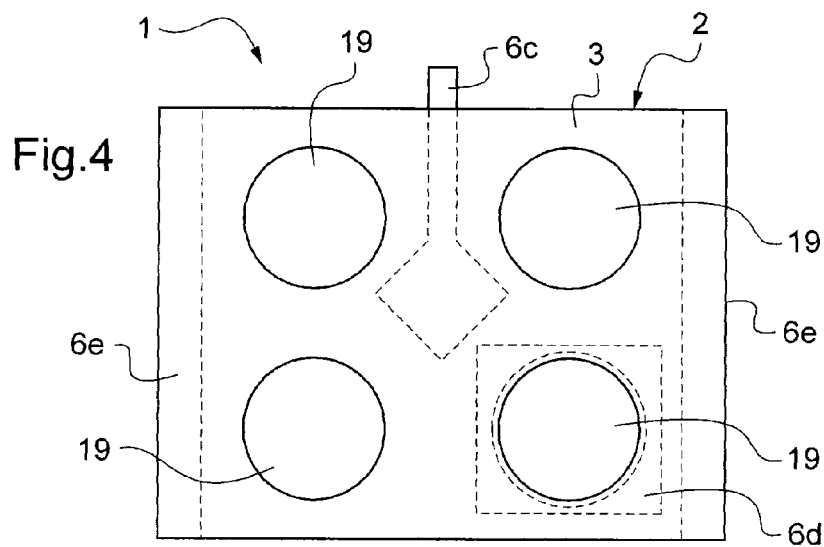
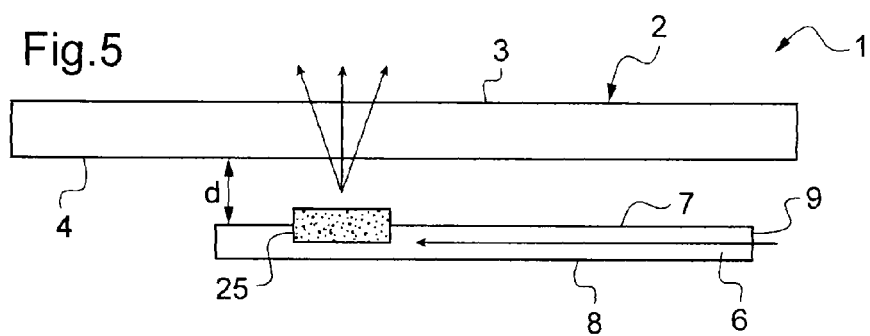
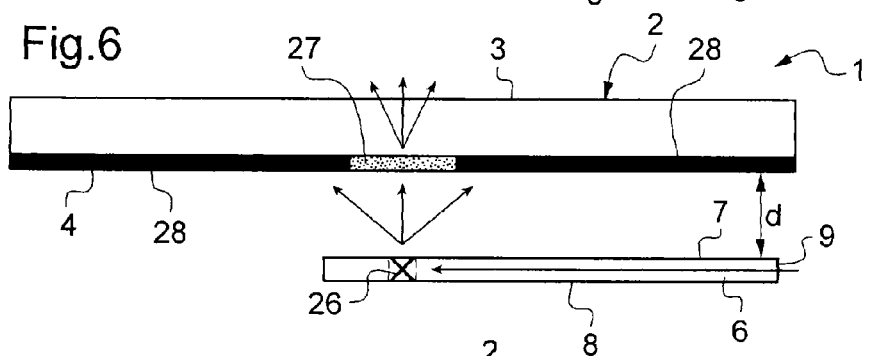
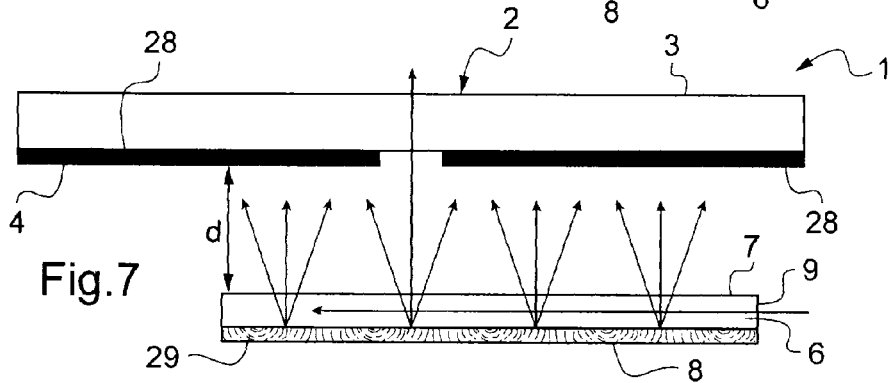

LIGHT-EMITTING, GLASS-CERAMIC ARTICLE

The present invention relates to a glass-ceramic article (or product), especially a glass-ceramic plate, intended in particular to cover or receive heating elements, said article being provided with an advantageous lighting means allowing at least one chosen zone of the article to be illuminated.

Sales of articles such as glass-ceramic ranges have been growing for several years. This success is explained in particular by the attractive appearance of such ranges and by the fact that they can be easily cleaned.

It will be recalled that a glass-ceramic is originally a glass, called a precursor glass (or mother-glass or green-glass), the specific chemical composition of which allows controlled crystallization to be induced by suitable heat treatments, called ceramification. This partly crystallized specific structure gives the glass-ceramic unique properties.

At the present time, there are various types of glass-ceramic plate, each variant being the result of extensive research and many tests, given that it is very difficult to make modifications to these plates and/or to the process for obtaining them without risking an unfavorable effect on the desired properties. To be able to be used as a range, a glass-ceramic plate must generally have a transmission in the wavelengths in the visible range that is both low enough to mask at least some of the underlying heating elements when not in use and high enough so that, depending on the circumstances (radiant heating, induction heating, etc.) the user can, for the sake of safety, visually detect the heating elements that are in operation and/or can, if required, read displays. The glass ceramic plate must also have a high transmission in the wavelengths of the infrared range, especially in the case of plates with radiant heaters.

Most current plates are of dark color, in particular black, but there are also plates of lighter color (in particular white having, for example, a haze of at least 50%, as described in patent FR 2 766 816), or even transparent plates provided with opacifying coatings (enamel, paint) and/or reflective coatings (reflective films deposited by magnetron sputtering or incorporating reflective pigments).

Up to the present time, lighting effects observed on glass-ceramics have mainly been caused by operation of heating systems and/or created separately with displays, but a specific solution has not been developed for targeted lighting, whether functional and/or aesthetical (identification of certain zones such as heating zones, creation of illuminated logos, etc.), of other zones, especially of larger extent, independently of the operational state of the heating zones, in particular for the commonest, dark colored plates, with a more limited light transmittance.

Furthermore, even if in the past heating zones could be demarcated using resistance heaters, in the case of ranges with radiant heaters, this is no longer possible in the case of induction ranges in which there is no heating resistance, the heating zone being in this case up to the present time demarcated by screen printing.

The object of the present invention is to provide improved novel glass-ceramic articles (such as plates), in particular novel glass-ceramic articles that are illuminated especially in order to actively mark one or more heating zones but also possibly to functionally and/or decoratively (patterns, logos) illuminate other zones, and this whatever the heating mode used for the article and whatever the color of the zone to be illuminated, the invention being in particular suited to dark-colored and/or very absorbent plates.

This object is achieved by the novel article according to the invention, having at least one lighting zone (or zone intended to be illuminated), said article comprising at least one glass-ceramic substrate (in particular a plate, intended for example to cover or receive at least one heating element), and, in addition to the substrate, at least one optical guide (or light guide), this guide being coupled to at least one light source on one side outside of the lighting zone, and (said article) comprising, in the lighting zone, at least one means of extracting the radiation emitted by the source.

Advantageously, the substrate and the guide have the same shape (both are planar for example or have the same curvature(s) if required) and are oriented along the same direction (parallel for example in the case of planar elements, as in a multilayer structure). They may or may not make contact with each other (for example they may be separated, in particular equidistantly, by a few millimeters or centimeters, by an air-filled cavity located between the substrate and the guide, the cavity possibly thermally and mechanically isolating the guide from the substrate) and are, in an advantageous embodiment, adjoining or in contact, thus forming a compact structure, or even separated by a air-filled cavity.

Preferably, the article according to the invention is formed (as a substrate) of a glass-ceramic plate that is planar or mostly planar (i.e. most of its area is planar, in particular it deviates from planarity along a diagonal by less than 0.1%, preferably by about 0%), and is intended to be used as a range, and the light guide is also planar. In this case it is possible to qualify the article according to the invention as a "planar cooking module".

In the present text that follows it is thus also possible to qualify the article according to the invention as a "glass-ceramic" article because this article is above all based on glass-ceramic and intended to be used as a glass-ceramic, in particular being based on a glass-ceramic structure or substrate that is improved especially by connecting the light guide mentioned above, and being intended for glass-ceramic-specific applications (ranges, etc.).

The expression "glass-ceramic articles" is understood to mean not only articles made of actual glass-ceramic but also articles made of any other material analogous to glass-ceramic (for example a gas range with a substrate based on a material analogous to glass-ceramic), this analogous material in particular being able to withstand high temperatures and especially having a zero or almost zero expansion coefficient (for example, in the case of glass-ceramic plates used with radiant heaters, lower than $15 \times 10^{-7}$ $K^{-1}$). Preferably, however, it is an article made of actual glass-ceramic.

As indicated above, the glass-ceramic substrate considered in the present invention is preferably a plate, having a main face (of larger dimensions) intended to be the upper face (visible face) in the use position, another main face intended to be the lower face (often hidden, in the body or housing for example of a stove) in the use position, and an edge face (or side or thickness). The upper face is generally planar and smooth but the plate may also comprise at least one protruding zone and/or at least one recessed zone and/or at least one aperture (for example if the plate incorporates an aperture intended to receive an atmospheric gas burner). In parallel, the plate may have a lower face that is smooth or be provided with bumps that increase its strength and that are obtained for example by lamination. In a preferred embodiment, the plate has a smooth lower face so as to combine better with the light guide.

It is also preferable, in particular when the glass-ceramic substrate is a plate, for the light guide to also be a plate with an edge face and two main faces, and for it to be advantageously connected (it is generally assembled after having been produced separately) to the lower face (in the use position) of the aforementioned substrate. A planar guide is particularly advantageous, such a guide being simple, effective and able to supply (for example with appropriate apertures and/or treatments, as will be explained below) several lighting zones whatever their size (in particular small-diameter heating zones), position, etc.

The guide may be parallelepiped-shaped, with main faces that are rectangular or of any other shape (the shape possibly depending on the lighting zone or zones desired), said faces possibly having the same dimensions as the main faces of the substrate (the guide generally covers at least part of one face of the substrate and may cover all of said face) or different dimensions, in particular one or more dimensions (length, width) may be smaller (whether slightly or not, the guide possibly covering only a small portion of the face of the substrate) and/or one or more dimensions may be slightly larger (for example the guide may project beyond one side of the substrate, in particular beyond one of its sides bearing one or more light sources so that the latter are distanced from heating regions or from the entire glass-ceramic substrate). Preferably the guide has one or more dimensions (in particular peripheral dimensions) that are smaller than or equal to those of the plate.

Even if use of a multi-component (with a gas- or air-filled cavity) or laminated guide incorporating several mineral and/or organic layers is not ruled out, the guide is advantageously monolithic so as to make it simpler, more compact and lighter. The guide may advantageously be thinner than the glass-ceramic substrate (generally 3 or 4 mm for a glass-ceramic range) and it may be very thin: it is for example at least 2 mm and preferably less than 6 mm in thickness (especially for reasons of weight and compactness).

The guide may be organic and/or plastic (for example made of polycarbonate or polymethyl methacrylate PMMA), or mineral and is preferably mineral. In particular it is an (organic or mineral, preferably mineral) glass. Said glass may possibly have undergone a chemical or heat treatment to toughen, anneal or temper it. The light guide is preferably a glass plate (having external or peripheral dimensions smaller than or equal to those of the substrate). Use of a guide made of a glass-ceramic, in particular a clear glass-ceramic, is not ruled out.

The guide is advantageously clear or transparent. Preferably the transmission factor around the peak wavelength is higher than or equal to 50%, even more preferably higher than or equal to 70%. It is preferably made of a clear soda-lime-silica glass (in particular having a light transmittance $T_L$ higher than or equal to 90%) or an extra-clear soda-lime-silica glass (in particular having a light transmittance $T_L$ higher than or equal to 91.5%), or borosilicate glass, etc. However, use of darker glass or of a glass that is slightly tinted through its thickness, or of a clear/slightly opaque glass-ceramic, for example the glass-ceramic KeraLite produced by Eurokéra, is not ruled out.

Thus the article according to the invention may be based on any glass-ceramic whatever its color, whether it is clear, dark, transparent (such as the plates sold under the trade name KeraLite by Eurokéra and Kéraglass) or translucent and may in particular, and advantageously, be based on a black-colored glass-ceramic having a low light transmittance, lower than 5% (such as the plates sold under the trade name Kérablack by Eurokéra) and/or have (the article or the substrate) an opacity such that it is possible to mask for example underlying elements, the dark color of the glass-ceramic substrate not preventing the targeted creation of one or more light-emitting zones (lighting zones) especially by way of the light guide combined externally to said substrate.

The article according to the invention may thus have one or more light-emitting zones for functional and/or decorative (illustration, logo, alphanumeric signal, etc.) purposes, those zones generally being observed via the main faces (especially the upper face) of the glass-ceramic substrate and in the thickness of said substrate. The one or more light-emitting zones may be located in any zone of the plate (including the heating zones) and furthermore, it is possible to have a number of differing light-emitting (or lighting) zones (differing colors, brightness levels, and/or each zone may itself exhibit different colors—for example a zone may take the form of a bicolored circle surrounding a heating zone—depending on the lighting zone, the cut of the guide or guides, the extracting means, etc.), and/or zones with separate functions (lighting, decoration, display, etc.). When the structure (the substrate) of the article is made of a glass-ceramic plate and is intended to cover or receive at least one heating element, the article may advantageously possess one or more illuminating (or lighting) zones that make it possible to detect heating elements that are in use or still hot, especially one or more circular or geometrical zones each surrounding a zone in line with a heat source.

In one particularly preferred embodiment, the light guide, in the form of a plate, has at least one aperture in at least one lighting zone, especially when said zone is intended to surround and indicate the heating zone.

It will be noted in this respect that, in the present invention, the expression "in a/the lighting zone" is understood to mean a zone of the article, in particular a zone of the guide or possibly of the substrate (depending on which is considered), that is located in line with (below, in the use position) the lighting zone provided on the substrate (observed via the upper face) and having substantially identical dimensions. The expression "outside of the lighting zone" is understood to mean a zone outside of the preceding zone, in particular distanced from the preceding zone (distanced from the zone in line with the lighting zone on the glass-ceramic substrate).

Each aperture in the light guide (intended to be located) in line with a heating zone has a number of advantages: it may especially enable the customary incorporation of heating elements, in particular when it is necessary for the heating elements to be placed near zones of the glass-ceramic substrate which require heating (the diameter of the aperture then being larger than or equal to, preferably larger than the outside diameter of the heating element). Furthermore, this aperture also has an influence on the lighting zone provided if required to indicate the heating zone, especially via the choice of its edges (inclined, uninclined or rounded) and their possible texture or coating (the edges of the aperture forming if required the means for extracting the radiation mentioned in the definition of the invention) i.e. an enamel, roughening by sandblasting or acid-etching, inclination, etc. The edges of one or more apertures may be straight or rounded but they are preferably beveled (in particular chamfered) or inclined, in particular at an angle of about 45°, so as to enable better extraction of the light (radiation), transmitted by the light guide to the one or more lighting zones and/or so as to redirect the radiation towards an extracting zone (or means). Thus the guide preferably has one or more frustoconical apertures.

Each aperture may also be made reflective, for example using an adhesive metallic tape or a metallic layer or a mirror layer or a silver deposit, etc., so as to ensure optimal reflection of the guided radiation. The metal or mirror layer may especially be deposited/be present on the face of the guide opposite the glass-ceramic substrate (lower face for a planar cooking module) on at least one part of the edge of the guide surrounding the one or more apertures concerned, in order to increase the amount of light extracted towards the substrate.

It will be noted that the article according to the invention may also comprise a number of guides each dedicated to one or more lighting zones; nevertheless, a unitary guide, provided if required with apertures as mentioned above, is advantageous, this guide especially making manufacture and assembly easier.

The light guide is generally connected to the substrate by adhesive bonding and/or clip-fastening, but may also be joined by encapsulation, etc. As mentioned above, it is located outside of the substrate and thus enables, inter alia, the light to be better guided to the desired lighting zones, in particular when the substrate is a dark color, as is often the case with glass-ceramics.

In an alternative embodiment in which the guide is not directly joined to the substrate, the light guide may be coupled in operation to the glass-ceramic substrate but connected to another part of the article or to a support on which the article is mounted, for example, in the case of a cooking module or apparatus, connected to the housing of the cooking apparatus on which the glass-ceramic substrate is mounted (the housing possibly if required forming part of the article).

The article according to the invention also comprises at least one light source coupled to the guide (attached to the guide and cooperating with said guide by emitting light rays into the guide so that the guide can transmit them) so as to propagate the light (in particular by total internal reflection or by metallic reflection) inside the guide (in its thickness), especially coupled to an edge of the edge face of the guide or to an edge of one of the main faces (especially housed in a cavity, a groove, a strip, etc.), outside of the lighting zone as specified according to the invention, the one or more light sources preferably emitting/being coupled to the edge face or side of the guide.

The fact that the light sources, coupled with the one or more guides, are distanced from the one or more lighting zones, especially when the latter are used to indicate heating zones, in particular makes it possible to prevent damage to the sources by heat from the heating elements coupled to the plate, to obviate bulk-related problems due to part of the lower area having to be occupied by other elements (heating elements) cooperating with the plate, to multiply the lighting zones (depending on the form of the one or more guides) without multiplying the sources and it makes it possible to mask the sources (for example, if they are removed to the periphery of the article, by applying a layer of opaque enamel to the periphery of the substrate).

It is possible to provide a number of sources (their number and their arrangement possibly varying to make the lighting more uniform) and/or the light source may be continuous or discontinuous; it is preferably formed by (light-emitting) diodes (LEDs), generally aligned and spaced out to a greater or lesser extent, and/or possibly by optical fibers with light injection occurring via lateral extraction from the fiber along the injection edge (preferably the edge face) of the guide. Diodes are particularly advantageous in the present invention especially in terms of bulk, effectiveness, durability and resistance to surrounding conditions (heat, etc.).

The diode-based source may be encapsulated, i.e. it may comprise a semiconductor chip and an epoxy or nylon resin covering that encapsulates the chip.

The diode may also be a semiconductor chip without a collimating lens, for example having dimensions of about roughly a hundred microns or a millimeter, and optionally minimal encapsulation—for example for protection purposes.

The diodes may be borne by a support or strip or mounting, this mounting possibly also having a (flat or inclined) surface that has been treated and/or made reflective about the group of diodes so as to increase further their luminous efficiency, for example coated with lacquer or with paint and/or a mirror layer, and/or a white or metallic reflector so as to better direct the radiation emitted into the guide.

The one or more sources may be joined (especially to the guide) by clip-fastening, adhesive bonding, etc. especially via an element. For example, in the case of diodes, it is possible to mount the diodes, soldered to a support itself housed within a metal strip, by clip-fastening or adhesive bonding of the strip to the edge face of the guide.

The sources (and their power supply and control) may or may not be separate so as to allow, depending on the requirements, simultaneous or separate lighting of the lighting zones, as desired.

The article according to the invention also comprises, in the lighting zone, at least one means of extracting the radiation emitted by the one or more sources.

The extracting means may especially be one or more scattering elements or treatments. For example, the extraction may obtained by a layer added to the surface and/or any differential treatment or texture applied to the surface (whether locally or over the entire surface area), especially of the guide, such as by laser etching, enamel printing, chemical (acid, etc.) or mechanical (sandblasting, etc.) etching, etc., which forms a continuous or discontinuous network of scattering elements. The advantage of a discrete distribution of elements may be to obtain a guide that is transparent when the light source is turned off (for example with scattering elements between 0.03 mm$^2$ and 0.2 mm$^2$), which means that vision through the article according to the invention is not obstructed when it is not in use (heaters and lighting turned off), and/or to make the lighting uniform. The density of the scattering means may in particular be adjusted so as to make lighting of the chosen zones more uniform.

A scattering element may be present on the surface (especially of the guide), or an extracting area may also be provided in the thickness of the guide using for example internal laser etching technology. The one or more extracting means enable radiation from the guide to be extracted to the desired lighting zone.

In one embodiment, the guide comprises at least one extracting layer or extracting area (extracting light emitted by the source) on one of its main faces (especially the lower face or face opposite the glass-ceramic substrate), or optionally in its thickness, this layer or area being formed by a variable distribution of one or more scattering elements, so as to make at least part of the light exit via its main face turned towards the substrate (upper face of the guide for a planar cooking module).

When the guide has at least one aperture as mentioned above, the geometry and the roughness of the edge of the aperture may also advantageously be worked to allow local and controlled extraction of the light, as mentioned above.

The extracting area may have any shape whether geometrical or not, it may have one or more parts and may form a geometrical zone, an illustration, a signal (arrow, letter, etc.), patterns whether identical or different, on one part of the substrate (lighting zone) in a direction approximately perpendicular to the source axis and/or the main axis of the guide. The one or more extraction means may be localized (bevel, in the case of the aperture, and/or local texturing such as sandblasting of the surface) or not (all of one face of the guide could be textured for example), and may be combined if required with another treatment that makes it possible to target lighting zones, for example with a concealing layer (masking certain zones and preventing light from passing) screen-printed on the substrate, as explained and illustrated below.

The one or more scattering elements may function in reflection and/or in transmission. In reflection it/they has/have a light reflection coefficient ($R_L$) higher than 50%, especially higher than 70% and preferably higher than 90%, the light normally being extracted in the direction of the face opposite that comprising the diffusing element. In transmission, it/they has/have a light transmission coefficient ($T_L$) higher than 50%, especially higher than 70% and preferably higher than 90%, the light normally being extracted from the face comprising the diffusing element.

By way of nonlimiting example, in the case where the extracting means located on the guide is a white enamel, for example, it is preferably located on the lower face of the guide (or the face opposite the glass-ceramic substrate), extraction being greater on the side that has not been screen-printed (extraction then occurring mainly towards the substrate and not for example towards the housing in which the article is mounted in the case of a cooking module). In the case where a sandblasting treatment is used to form the extracting means on the guide, the treated face may this time be one and/or the other face.

The article according to the invention may comprise, if required, other elements and/or layers. For example, when it is a cooking module, the article may be equipped with (or associated with) one or more additional functional or decorative elements (frame, connector(s), cable(s), control element(s), display(s), for example 7-segment light-emitting diodes or liquid-crystal displays, touch-sensitive electronic control panel with a digital display, etc.). It may comprise various functional and/or decorative coatings based on enamel, paint, etc. in addition to, if required, coatings intended specifically for extraction purposes. For example, one of the faces of the substrate may comprise an enamel layer for decorating, masking (so as to hide the sources), or other purposes (making the lighting more uniform, etc.). The light guide may also comprise various coatings, for example it may be metallized, so as to prevent, for example in a cooking module, stray light from illuminating the base of the housing (the metallization possibly being carried out before or after the shaping of the internal edge of the apertures present, if required, on one or other of the faces of the guide).

The invention also relates to apparatus (or devices) for cooking and/or for maintaining high temperatures comprising at least one article according to the invention (for example stoves, embeddable ranges, ovens, etc.) and comprising, if required, one or more heating elements such as one or more radiant or halogen elements and/or one or more atmospheric gas burners and/or one or more means of heating by induction. The article according to the invention may also consist of a cooking apparatus comprising one or more heating elements other than the elements mentioned above in the definition of the invention. The invention encompasses both cooking apparatus comprising a single plate and apparatus comprising several plates, each of these plates being equipped with, if required, a single heater or multiple heaters. The expression "heater" is understood to mean a cooking station. The invention also relates to hybrid cooking apparatus the one or more cooking plates of which comprise several types of heater (gas burners, radiant, halogen or induction heaters). Furthermore, the invention is not limited to the manufacture of cooking plates or modules for stoves or cooktops. The articles manufactured in accordance with the invention may also be other planar modules or plates that must be highly insensitive to temperature variations.

The article according to the invention is thus a light-emitting article (having one or more lighting zones or zones intended to be illuminated) with good heat resistance and which is compatible with the use of various types of heating (induction, radiant or halogen, gas heating, etc) whatever the size of the heating elements used, which is scratch resistant and resistant to thermal shocks, which is resilient to aging, which provides the commonly desired opacity and withstands the various mechanical stresses encountered in glass-ceramic applications, and which is completely compatible with existing production lines. It is easy to manufacture and employ and shelters the light sources from high temperatures, which could possibly affect their efficiency and their service life, and has targeted and uniform lighting zones. The system furthermore enables active and localized marking (on/off state, color or brightness adjusted to the temperature, light shows, etc.) of heating zones if required, and remains small in bulk when it is a planar cooking module.

The present invention also relates to a method for manufacturing an article according to the invention, in which the precursor glass (or parent-glass or green-glass) is ceramized so as to obtain the glass-ceramic substrate, then the light guide is connected, in particular it is joined to the glass-ceramic substrate.

It will be recalled that glass-ceramic plates are generally manufactured as follows: in a melting furnace glass having the composition chosen to form the glass-ceramic is melted, then the molten glass is rolled into a standard ribbon or sheet by passing the molten glass between rollers and the glass ribbon is cut to the desired dimensions. The plates thus cut are then ceramized in a way known per se, the ceramization consisting in baking the plates with the chosen temperature profile so as to transform the glass into the polycrystalline material called "glass-ceramic", the expansion coefficient of which is zero or almost zero and which can withstand a thermal shock of possibly as much as 700° C. The ceramization generally comprises a step of progressively increasing the temperature to the nucleation temperature, generally located in the vicinity of the transformation domain of the glass; a transition step lasting several minutes in which nucleation occurs; progressively increasing the temperature once more up to the ceramization ceiling; holding the temperature at the ceramization ceiling for a number of minutes; and then rapid cooling to ambient temperature. If required, the process also comprises a cutting operation (generally before ceramization), for example by waterjet cutting or mechanical tracing with a scoring wheel, etc., followed by a shaping operation (grinding, beveling, etc.).

Other details and advantageous features will become clear below from the description of nonlimiting embodiments of the invention given with reference to the annexed drawings in which:

FIG. 4 shows schematically a top view of an article according to the invention with various possible light guides;

FIG. 5 shows schematically a cross-sectional view of an article according to the invention with a local extracting means;

FIG. 6 shows schematically a cross-sectional view of another article according to the invention equipped with various layers and/or treatments, one of which serves to extract the light; and FIG. 7 shows schematically a view in cross-section of another article according to the invention equipped with various layers and/or treatments one of which serves to extract the light.

In the figures the same references denote the same parts of the articles.

Figure 1:
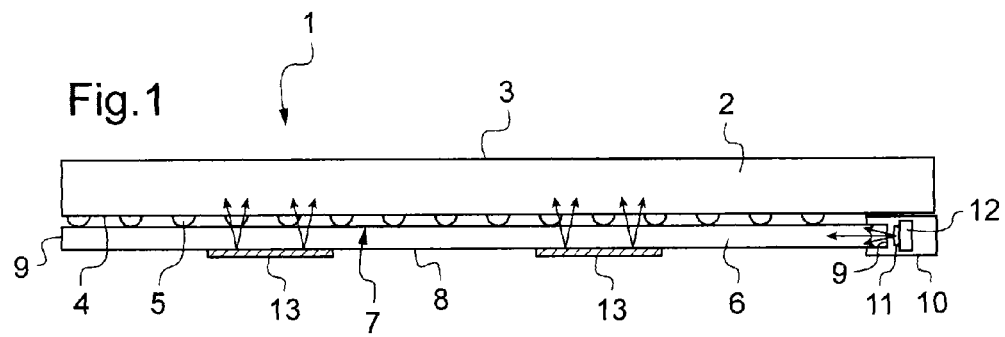
FIG. 1 shows schematically a cross-sectional view of an article according to the invention having at least two lighting zones.

In FIG. 1, the article 1 is a planar cooking module comprising a glass-ceramic plate 2 (substrate) having a smooth upper face 3 and a lower face 4 equipped with bumps 5 (this face possibly also advantageously not comprising bumps), and which also comprises a light guide 6 connected under the substrate, the guide taking the form of a plate of clear borosilicate glass 3 or 6 mm in thickness, the guide having an upper face 7, a lower face 8 and an edge face 9 and the guide being coupled to a light source 10 (that does not project beyond the plate 2 so as to form a compact module) formed by a plurality of LEDs 11 borne by a mounting housed in a strip 12—the LEDs emitting radiation into the guide as indicated by the arrows. Said source is located on part of the edge face of the guide outside of the lighting zones and heating zones and the article furthermore comprises a means for extracting the radiation emitted by the source, this means taking the form of at least two enamelled or sandblasted zones 13 each located under each of the desired lighting zones (not shown, but appearing in operation on the upper face of the substrate in line with the extracting zones, as indicated by the arrows).

Figure 2:
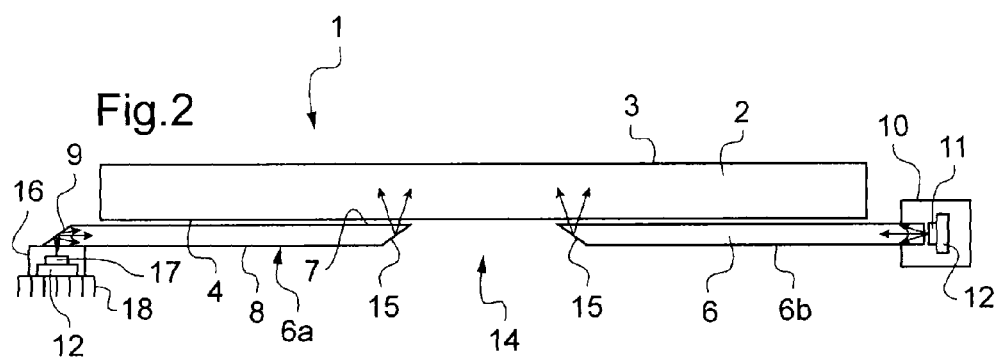
FIG. 2 shows schematically a cross-sectional view of another article according to the invention having at least one circular lighting zone bounding a heating zone.
Figure 3:
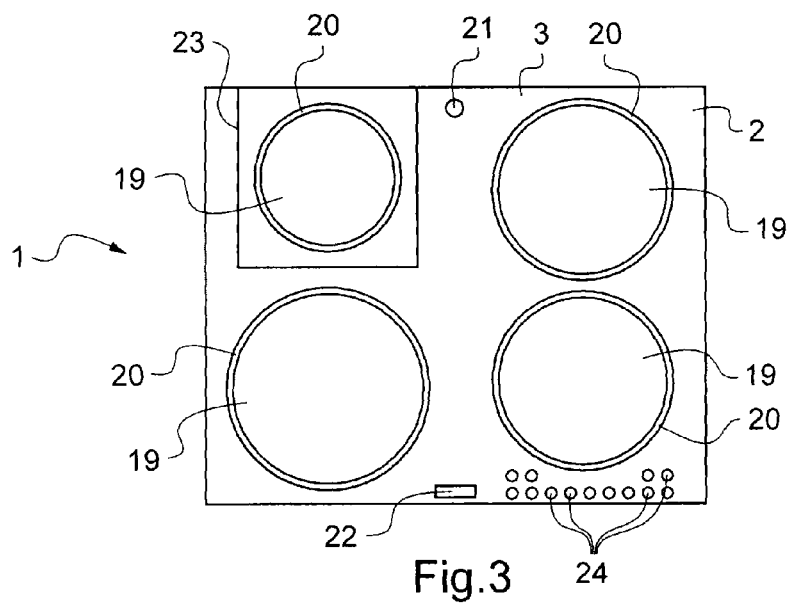
FIG. 3 shows schematically a top view of an article according to the invention with the lighting in operation.

In the variant in FIG. 2, the article (the substrate of which this time has a lower face denuded of bumps) this time comprises, for the radiation extraction, an aperture 14, for example 170 mm in diameter, in the light guide 6 in line with an underlying heating element (not shown) that may be housed in said aperture under the glass-ceramic plate, the edges 15 of the aperture being beveled/chamfered to 45° and roughened, the bevel (chamfer) and the roughness forming the means for extracting the light, the angle of the bevel being optimized so as to maximize the amount of light extracted and the roughness making the distribution of light uniform, the light thus being redirected (as indicated by the arrows) towards a chosen lighting zone (not shown, appearing in operation on the upper face of the substrate around the heating zone, similarly to the case shown in FIG. 3). Alternatively to the aperture within the unitary waveguide, a plurality of planar light guides (6a, 6b) may be used, which allow one or more uncovered zones (apertures) to be seen and which produce the given one or more lighting zones, at least one other light source 16 (formed of a plurality of LEDs 17 borne by a mounting housed in a strip 12) possibly being, in this case, coupled to another waveguide (this other source being optional in the first case where the waveguide is unitary).

In the embodiment shown in FIG. 2, the first source 10 is this time shown (as a variant of FIG. 1) extending beyond the plate 2, and the second source 16, as a variant of the above two source positions, is shown distanced from the principal axis of the guide. This embodiment is especially useful for illuminating a low-transparency glass-ceramic plate when high-power LEDs are employed, the electrical power supplying the circuit assembly generating a lot of heat that it is necessary to dissipate effectively to prevent damage to the electrical system. Since effective radiative elements are generally bulky, this solution allows the light injection to be distanced so as to make it possible to position radiative elements 18 behind the LEDs.

In the embodiment in FIG. 3, the article has 4 heating zones 19 under which are located four heating elements (that cannot be seen from above), the light guide then being provided with four apertures of the type shown in FIG. 2; four lighting zones 20 can thus be illuminated independently (especially when there are a plurality of light guides), or simultaneously (especially when there is one light guide with a plurality of apertures) when the light source or sources are activated. Other decorative or functional zones (logos 21, inscriptions 22, signals 23, control buttons or indicators 24) can also be provided or indicated, for example using enamel (for example pattern 23) or by providing other lighting zones (illuminated frame on the periphery of the plate, lighting of a logo, etc.) using apertures in the guide such as in the zones 20 (the geometry of the hole in the guide possibly being altered to also allow the incorporation of elements that make contact with the glass-ceramic plate) and/or using extracting means (such as the means 13 in FIG. 1).

In the embodiment in FIG. 4, the article according to the invention comprises one and/or the other light-guide shapes shown (in dotted lines because they are on the lower face of the article) depending on the lighting type (zones) required. Alternatively, the light guide may be a single rectangular glass plate having the same shape and/or outside dimensions as the glass-ceramic substrate (and comprising, if required, one or more internal apertures, in particular frustoconical and/or beveled apertures, as in FIG. 2). The one or more light guides may be combined with concealing coatings or masking means (as illustrated in FIGS. 6 and 7) so as to give the lighting zones very particular shapes such as logos, etc. As shown in FIG. 4, it is possible for example to use an elongate light guide 6c having a variable cross section (wider at its end) for specific lighting of a central logo (in combination for example with other means bounding the edges of the logo), and/or a rectangular light guide 6d having a central aperture (of the same sort as that shown in FIG. 2) for lighting of a heating zone 19, and/or two elongate light guides 6e of constant cross section extending over only part of the length of the glass-ceramic plate, so as to illuminate for example the edges of the plate.

In the embodiment in FIG. 5, the one or more extracting means used (for example with the guides 6e of FIG. 4) may be localized, for example the means may be a local sandblasting 25 of the surface (the path taken by the light being indicated by the arrows). It may also be observed, in this embodiment, that the guide does not make contact with the substrate but is at a distance d from the latter, in spite of this, the guide may possibly be connected to the substrate (fixed to the substrate and able to be moved with it) or coupled to it but connected to the support (housing for example—not shown) on which the article is intended to be mounted.

In the embodiment in FIG. 6, the one or more extracting means used (for example with the guides 6c and 6d in FIG.

4) may be localized, for example the means may be one or more bevels 26, local sandblasting or local screen printing onto the guide, or said one or more means may not be localized (for example the entire area of the guide may be sandblasted or screen-printed), the means optionally being combined in FIG. 6 with other extracting or scattering means, located in particular on the substrate, such as a scattering screen-printed layer, and/or concealing means 28 (masking certain zones and stopping light from passing), located in particular on the substrate, such as a concealing screen-printed layer allowing lighting zones with particular outlines to be formed (the path taken by the light being indicated by the arrows). As above, in this embodiment, the guide does not make contact with the substrate but is at a distance d from the latter.

In the embodiment in FIG. 7, in addition to the concealing means 28 on the lower face of the substrate, a coating 29 is also employed, for example a screen-printed coating, on the lower face of the guide, so as to direct more light towards the substrate (for example a reflective coating), the pathway taken by the light being indicated by the arrows.

The articles, such as glass-ceramic plates, according to the invention may in particular be advantageously used to produce a new range of cooking plates for stoves or cooktops, but may also advantageously be used to produce wall elements or walls (for example doors or parts of doors) of ovens, etc.

The invention claimed is:

1. An article comprising:
  at least one lighting zone;
  at least one glass-ceramic plate including a glass-ceramic main surface; and
  at least one light guide defined by a substantially polygonal planar glass plate including a main surface facing the glass-ceramic main surface and including an elongate portion extending from the glass plate, an end of the elongate portion being coupled to at least one light source located outside a periphery of the glass-ceramic plate when seen from a to view, and the light guide including, in the lighting zone, at least one means for extracting radiation emitted by the light source to guide light toward the at least one glass-ceramic plate,
  the at least one extracting means being disposed on at least one of:
  a surface of the light guide opposite the glass-ceramic plate, and
  at least one layer internal to a thickness of the light guide;
  wherein the at least one lighting zone is configured to surround and indicate at least one heating zone.

2. The article as claimed in claim 1, wherein the at least one light source comprises at least one light-emitting diode.

3. The article as claimed in claim 1, wherein the light guide comprises, over at least part of the surface of the light guide opposite the glass-ceramic plate, a rough zone to enable local and controlled extraction of light.

4. The article as claimed in claim 1, wherein the at least one extracting means is localized to all of one face of the light guide.

5. A method of manufacturing an article according to claim 1, the method comprising:
  ceramizing precursor glass to obtain the glass-ceramic plate, then
  connecting the light guide to the glass-ceramic plate.

6. The article as claimed in claim 1, further comprising:
  a mirror layer disposed on the surface of the light guide opposite the at least one glass-ceramic plate.

7. The article as claimed in claim 1, wherein the light guide comprises, over at least part of a surface of the light guide, a coated zone covered by a coating to enable local and controlled extraction of light.

8. The article as claimed in claim 1, wherein the at least one extracting means is combined with at least one of
  a surface treatment,
  a concealing coating, and
  a screen printed layer
  formed on the glass-ceramic plate to target the at least one lighting zone.

9. The article as claimed in claim 1, wherein the at least one extracting means includes one or more scattering elements and the one or more scattering elements is in the range from 0.03 mm$^2$ to 0.2 mm$^2$.

10. The article as claimed in claim 1, wherein the at least one extracting means includes one or more scattering elements and the one or more scattering elements is an internal laser etching at the at least one layer internal to the thickness of the light guide.

11. The article as claimed in claim 1, wherein the at least one extracting means includes one or more scattering elements and the one or more scattering elements has a light reflection coefficient higher than 50%.

12. The article as claimed in claim 1, wherein the at least one extracting means includes one or more scattering elements and the one or more scattering elements has a light transmission coefficient higher than 50%.

13. The article as claimed in claim 1, wherein the at least one glass-ceramic plate has a transmission factor of a peak wavelength higher than or equal to 50%.

14. The article as claimed in claim 1, wherein the at least one extracting means includes at least one or more treatments which include an etched surface.

15. The article as claimed in claim 1, wherein the at least one glass-ceramic plate has a face provided with bumps to increase a strength of the at least one glass-ceramic plate and
  wherein a flat surface of the light guide directly contacts the bumps of the lower face of the at least one glass-ceramic plate.

16. An article comprising:
  at least one lighting zone;
  at least one glass-ceramic plate including a glass-ceramic main surface; and
  at least one light guide defined by a planar glass plate including a main surface facing the glass-ceramic main surface and including an elongate portion, an end of the elongate portion of the light guide being coupled to at least one light source outside a periphery of the glass-ceramic plate when seen from a top view, and the light guide including, in the lighting zone, at least one means for extracting radiation emitted by the light source to guide light toward the at least one glass-ceramic plate,
  wherein the light guide includes at least one aperture in the at least one lighting zone, and
  wherein the at least one means for extracting radiation includes a sandblasted zone on a surface of the light guide opposite the glass-ceramic plate.

17. An article comprising:
  at least one lighting zone;
  at least one glass-ceramic substrate; and
  at least one light guide, the light guide being coupled to at least one light source on one side outside of outside a periphery of the glass-ceramic plate when seen from a to view, and the light guide including, in the lighting zone, at least one means for extracting radiation emitted by the light source to guide light from the light source toward the glass-ceramic substrate, wherein the light guide includes at least one frustoconical aperture in the at least one lighting zone, and wherein the extracting means is combined with at least one of a surface treatment, a concealing coating, and a screen printed layer formed on a surface of the glass-ceramic plate proximate the light guide.

18. An article comprising:
at least one lighting zone;
at least one glass-ceramic plate including a glass-ceramic main surface; and
at least one light guide defined by a substantially polygonal planar glass plate including a main surface facing the glass-ceramic main surface and including an elongate portion extending from the glass plate, an end of the elongate portion being coupled to at least one light source located outside a periphery of the glass-ceramic plate when seen from a to view, and the light guide including, in the lighting zone, at least one means for extracting radiation emitted by the light source to guide light toward the at least one glass-ceramic plate, the at least one extracting means being disposed on at least one of:

a surface of the light guide opposite the glass-ceramic plate, and at least one layer internal to a thickness of the light guide;

wherein the light guide includes at least one aperture in the at least one lighting zone, or a frustoconical aperture, and the at least one lighting zone is configured to surround and indicate a heating zone.

19. The article as claimed in claim 18, wherein one or more edges of the aperture is beveled or chamfered.

* * * * *